(12) United States Patent
Kultala

(10) Patent No.: US 7,796,677 B2
(45) Date of Patent: Sep. 14, 2010

(54) RECEIVER AND RECEPTION METHOD

(75) Inventor: Teemu Kultala, Liminka (FI)

(73) Assignee: Nokia Corporation, Espoo (FI)

( * ) Notice: Subject to any disclaimer, the term of this patent is extended or adjusted under 35 U.S.C. 154(b) by 1113 days.

(21) Appl. No.: 11/454,788

(22) Filed: Jun. 19, 2006

(65) Prior Publication Data

US 2007/0248150 A1  Oct. 25, 2007

(30) Foreign Application Priority Data

Apr. 19, 2006  (FI) .............................. 20065242

(51) Int. Cl.
H04B 1/00 (2006.01)
(52) U.S. Cl. ..................................... 375/147
(58) Field of Classification Search .............. 375/136, 375/140, 147, 150, 260, 130, 146, 149, 152; 370/389, 252, 320, 209, 335, 342
See application file for complete search history.

(56) References Cited

U.S. PATENT DOCUMENTS

2003/0076787 A1* 4/2003 Katz et al. .................. 370/252
2004/0264558 A1* 12/2004 Chae et al. .................. 375/148
2006/0120311 A1* 6/2006 Berkovich .................. 370/310
2007/0025424 A1* 2/2007 Hahm et al. ................ 375/144
2007/0277008 A1* 11/2007 Svensson .................... 711/159

* cited by examiner

Primary Examiner—David C Payne
Assistant Examiner—Syed Haider
(74) Attorney, Agent, or Firm—Squire, Sanders & Dempsey, LLP

(57) ABSTRACT

A data reception method and a receiver in a WCDMA telecommunication system are provided. The receiver comprises a sampler (208) for sampling a received frame format signal comprising at least two diversity branches; a despreader (210) for despreading the sampled signal, the despreaded signal comprising symbols; a first memory (212) for storing the symbols. A diversity combiner (214) reads the symbols from the first memory and diversity-combines the symbols an output of the combiner comprising combined symbols comprising two bits each. A deinterleaver (216) deinterleaves the bits at the output of the combiner by calculating a location of each bit in a deinterleaved frame on the basis of the location of the bit in the received frame. A second memory (218) stores the bits in the calculated location.

12 Claims, 2 Drawing Sheets

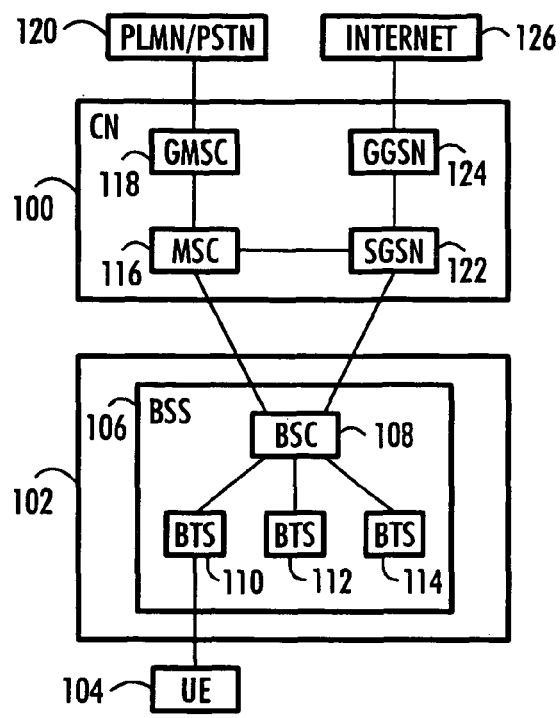
Fig. 1
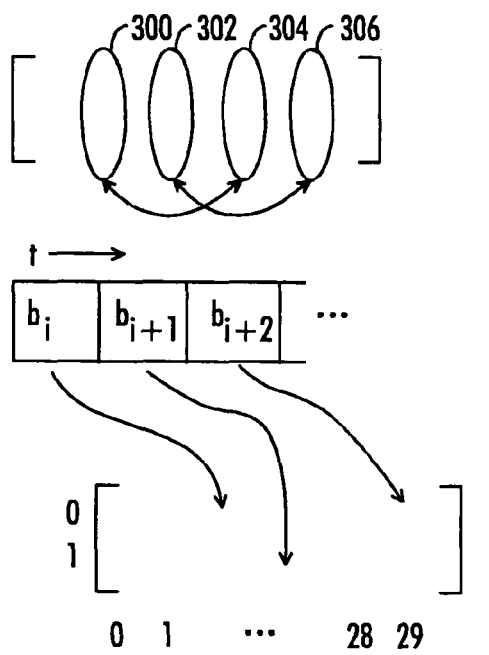
Fig. 3A
Fig. 3B
Fig. 3C

RECEIVER AND RECEPTION METHOD

FIELD

The invention relates to data reception in a WCDMA telecommunication receiver. Particularly, the invention relates to memory usage and de-interleaving in a receiver.

BACKGROUND

In wireless telecommunication systems, the design of data transmission is a challenging task. The data transmission may be impaired by several factors, such as fast and slow fading, interference from other systems and interference from other users within the same system.

Different methods have been developed against these impairments. These methods include the use of diversity in the transmission and reception and interleaving of a signal. When diversity is used, more than one transmission path is utilized between a transmitter and a receiver. In systems employing WCDMA (Wideband Code Division Multiple Access), multipath propagation is used as a diversity method. In diversity methods, information contained in a plurality of received signals that do not correlate with one another is combined. In WCDMA multipath reception, diversity signals are combined after despreading.

In a typical radio channel between a transmitter and a receiver, errors occur in bursts, in other words they are unevenly distributed in time domain. This is the reason for using interleaving, which aims at changing the bursty errors caused by a channel to separate errors independent of each other. In systems where a signal is transmitted in frame format, interleaving may be realized in a transmitter by rearranging the bits in the frame so that long error bursts can be randomized when deinterleaving is performed in a receiver.

One problem with interleaving is the usage of memory. In many WCDMA receiver implementations, the output of a diversity combiner is usually stored in a buffer memory. After all symbols of a frame have been received and stored in the buffer memory, a deinterleaving unit reads the buffer memory, and stores a deinterleaved frame in another buffer memory. The realization of multiple buffers after diversity combiner increases the size of an integrated circuit used in the implementation of base band parts of a WCDMA receiver. In addition, processing delays in the receiver are increased.

BRIEF DESCRIPTION OF THE INVENTION

An object of the invention is to provide an improved solution for data reception and deinterleaving. According to an aspect of the invention, there is provided a data reception method in a WCDMA telecommunication receiver, the method comprising: receiving a frame format signal with at least two diversity branches; converting the signal into a digital form; sampling the signal; despreading the sampled signal, the despreaded signal comprising symbols; storing the symbols in a first memory; reading the symbols from the first memory and diversity-combining the symbols in a combiner, an output of the combiner comprising combined symbols comprising two bits each; deinterleaving the bits at the output of the combiner by calculating a location of each bit in a deinterleaved frame on the basis of the location of the bit in the received frame; and storing the bits in a second memory in the calculated location.

According to another aspect of the invention, there is provided a receiver in a WCDMA telecommunication system, comprising: a sampler for sampling a received frame format signal comprising at least two diversity branches; a despreader for despreading the sampled signal, the despreaded signal comprising symbols; a first memory for storing the symbols; a diversity combiner for reading the symbols from the first memory and diversity-combining the symbols, an output of the combiner comprising combined symbols comprising two bits each; a deinterleaver for deinterleaving the bits at the output of the combiner by calculating a location of each bit in a deinterleaved frame on the basis of the location of the bit in the received frame and a second memory for storing the bits in the calculated location.

According to another aspect of the invention, there is provided an integrated circuit, comprising: a sampler for sampling a frame format signal comprising at least two diversity branches; a despreader for despreading the sampled signal, the despreaded signal comprising symbols; a first memory for storing the symbols; a diversity combiner for reading the symbols from the first memory and diversity-combining the symbols in a combiner, an output of the combiner comprising combined symbols comprising two bits each; a deinterleaver for deinterleaving the bits at the output of the combiner by calculating a location of each bit in a deinterleaved frame on the basis of the location of the bit in the received frame and a second memory for storing the bits in the calculated location.

According to another aspect of the invention, there is provided a receiver in a WCDMA telecommunication system, comprising: means for sampling a received frame format signal comprising at least two diversity branches; means for despreading the sampled signal, the despreaded signal comprising symbols; first memory means for storing the symbols; combining means for reading the symbols from the first memory means and diversity-combining the read symbols, the output of the combining means comprising combined symbols comprising two bits each; means for deinterleaving the bits at an output of the combining means by calculating a location of each bit in a deinterleaved frame on the basis of the location of the bit in the received frame and second memory means for storing the bits in the calculated location.

According to yet another aspect of the invention, there is provided a computer program distribution medium readable by a computer and encoding a computer program of instructions for executing a computer process for data reception method in a WCDMA telecommunication receiver, the process comprising: receiving a frame format signal with at least two diversity branches; converting the signal into a digital form; sampling the signal; despreading the sampled signal, the despreaded signal comprising symbols; storing the symbols into a first memory; reading the symbols from the first memory and diversity-combining the symbols in a combiner, an output of the combiner comprising combined symbols comprising two bits each; deinterleaving the bits at the output of the combiner by calculating a location of each bit in a deinterleaved frame on the basis of the location of the bit in the received frame; and storing the bits in a second memory in the calculated location.

The invention provides several advantages. The proposed solution decreases processing delays and buffering requirements in a WCDMA receiver. When the base band parts of a receiver are realized on an integrated circuit, the size of the integrated circuit implementing the parts may be reduced due to the smaller amount of memory required.

LIST OF DRAWINGS

In the following, the invention will be described in greater detail with reference to embodiments and the accompanying drawings, in which FIG. 1 illustrates an example of a structure of a cellular telecommunication system;

FIGS. 3A to 3C illustrate an example of interleaving and deinterleaving; and

DESCRIPTION OF EMBODIMENTS

Figure 2:
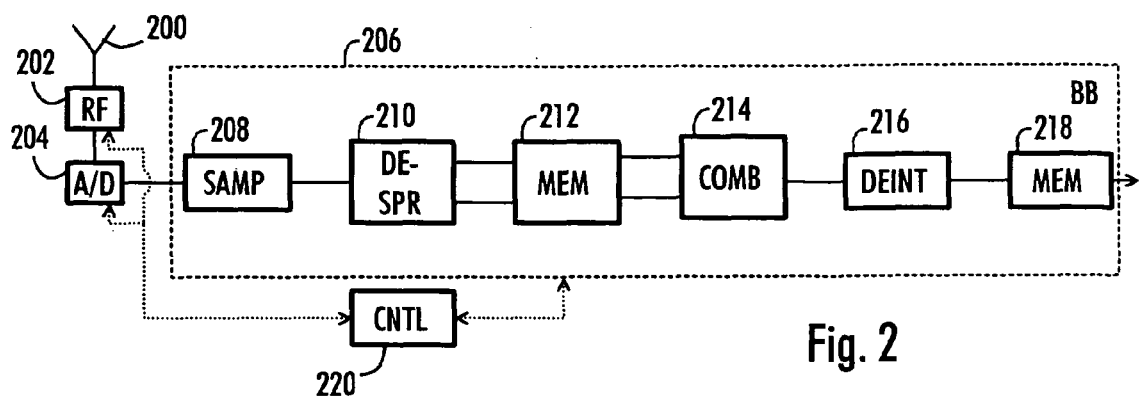
FIG. 2 illustrates an example of a receiver where embodiments of the invention may be utilized.

The present invention is applicable in various WCDMA telecommunication systems. A typical example of a system to which the invention can be applied is UMTS (Universal Mobile Telecommunication System).

Let us take a closer look at FIG. 1, which illustrates an example of a structure of a cellular telecommunication system. FIG. 1 is a simplified block diagram describing the most important cellular telecommunication system parts at network element level and interfaces between them. The structure and operation of the network elements are not described in detail, since they are commonly known.

The cellular telecommunication system may be divided into a core network (CN) 100, a radio access network (RAN) 102, and a mobile station (MS) 104.

The RAN 102 includes a base station system (BSS) 106, which includes a base station controller (BSC) 108 and base stations (BTS) 110, 112 and 114. A base station system, a base station controller and a base station may also be called a radio network subsystem (RNS), a radio network controller (RNC) and node B, correspondingly.

The structure of the core network 100 supports both circuit-switched connections and packet-switched connections.

A Mobile Services Switching Center MSC 116 is the center of the circuit-switched side of the core network 100. The functions of the mobile services switching center 116 include: switching, paging, location registration of user equipment, handover management, collecting subscriber billing information, encryption parameter management, frequency allocation management and echo cancellation. The number of mobile services switching centres 116 may vary: a small network operator may be provided with a single mobile services switching center 116, but larger core networks 100 may be provided with several.

Larger core networks 100 may comprise a separate Gateway Mobile Services Switching Center GMSC 118 handling the circuit-switched connections between the core network 100 and external networks 120. The gateway mobile services switching center 118 is located between the mobile services switching centers 116 and the external networks 120. The external network 120 may for instance be a Public Land Mobile Network PLMN or a Public Switched Telephone Network PSTN.

The network elements described in FIG. 1 are operational entities, and the physical implementation thereof may vary.

A Serving GPRS Support Node SGSN 122 is the center of the packet-switched side of the core network 100. The main task of the serving GPRS support node 122 is to transmit and receive packets with the user equipment 104 supporting packet-switched transmission using the base station system 106. The serving GPRS support node 122 includes subscriber data and location information concerning the user equipment 104.

A Gateway GPRS Support Node GGSN 124 is the corresponding part on the packet-switched side to the gateway GMSC 118 on the circuit-switched side. The gateway GPRS support node 124 must be able to route the outgoing traffic from the core network 100 to external networks 126. In this example, the Internet represents the external networks 126.

The base station system 106 is composed of a Base Station Controller BSC 108 and Base Transceiver Stations or Base Stations BTS 110, 112 and 114. The base station controller 108 controls the base stations 110, 112 and 114. In principle, the aim is to place the equipment implementing the radio path and the functions associated therewith in the base station 110, 112 and 114 and to place the control equipment in the base station controller 108.

The base station 110, 112 and 114 is responsible for creating physical carriers. Typically, one base station serves one cell, but a solution is also possible in which one base station 110, 112 or 114 serves several sectorized cells. The base station 110, 112 and 114 has following functions: calculations of timing advance, measurements in the uplink direction, channel coding, encryption, decryption, and frequency hopping, for example.

The subscriber terminal 104 includes at least one transceiver that implements the radio connection to the radio access network 102 or to the base station system 106. In addition, the subscriber terminal 104 typically comprises an antenna, a processor controlling the operation of the device, and a battery. Many kinds of subscriber terminals 104 with various properties exist, for instance vehicle-mounted and portable terminals.

A terminal requires a radio channel when it communicates with a base station during a call, for example. A radio channel is allocated to the terminal in a network element of the telecommunication system responsible for channel allocation.

Interleaving may be applied both in uplink and downlink directions. FIG. 2 illustrates an example of a receiver to which embodiments of the invention may be applied. The receiver may be a base station receiver or a mobile station receiver.

The receiver comprises an antenna 200 which receives a signal transmitted by a transmitter. The signal is transmitted by a transmitter in frames. The bits in the frames have been interleaved. The received signal may comprise multipath propagated components. These signal components propagated via different paths arrive at the receiver at different times. A WCDMA receiver may utilize multipath diversity, i.e. combine the signal components. A received signal is taken to a radio frequency unit 202 which filters and amplifies the signal. The amplified signal is taken to a converter 204 which converts the signal into digital form. From the converter the signal is taken to base band parts 206 of the receiver.

The base band parts 206 comprise a sampler 208 which takes samples of the received signal. The base band parts 206 comprise a despreader 210 which despreads the sampled signal. In the input of the despreader 210, the signal consists of chips, and in the output of the despreader the signal consists of symbols of two bits each. The sampling and dispreading may be performed in ways known to one skilled in the art.

The symbols in the output of the despreader 210 are stored in a first memory 212. The symbols of multipath propagated signal components are stored separately.

The base band parts 206 comprise a combiner 214 which reads the multipath propagated symbols from the first memory 212. The combiner 214 combines such diversity symbols into a combined symbol comprising two bits, and places the bits in the output of the combiner 214.

The base band parts 206 further comprise a deinterleaving unit 216 which reads bits from the output of the combiner 214 one bit at a time, determines the location of the read bit in the received frame and calculates a location for the bit in a deinterleaved frame on the basis of the determined location.

The deinterleaving unit 216 stores the bit in the calculated location of a second memory 218.

From the second memory 218 the bits are taken to other parts of the receiver.

The receiver may further comprise a controller unit 220 which controls the operation of the receiver. For example, at the beginning of a connection the receiver may communicate with the transmitter when the transmitter informs the receiver of the channel frame format used on the connection. The controller 220 may control the different parts of the receiver so that the correct frame format is taken into account. The frame format has an effect on the deinterleaving process.

With reference to FIGS. 3A to 3C, let us study an example of how interleaving and deinterleaving may be realized. FIGS. 3A and 3B illustrate interleaving process in a transmitter. FIG. 3A illustrates a frame in a transmitter. In this example, the frame comprises sixty bits. In interleaving, the frame is in the form of a matrix having two rows and thirty columns. In a UMTS WCDMA system, the number of bits in a frame is always a multiple of thirty. Thus, the number of columns in the matrix representing a frame is always thirty and the number of rows may vary depending on the data rate used. However, the embodiments of the invention are not limited to any particular matrix size.

In the transmitter, bits to be transmitted are written in to the matrix row by row. Thus, in this example, the first row comprises bits $b_1, b_2, \ldots, b_{30}$ and the second row bits $b_{31}, b_{32}, \ldots, b_{60}$. Next, the columns of the matrix are permutated, i.e. the order of the columns is exchanged. FIG. 3B illustrates the permutation. Columns 300 and 302 change places and likewise columns 304 and 306. As a non-limiting example of permutation, let us study a UMTS WDMA system. In this system, the columns are numbered 0,1,2, ... 29 from left to right. An inter-column permutation pattern (the order of columns after permutation) is 0, 20, 10, 5, 15, 25, 3, 13, 23, 8, 18, 28, 1, 11, 21, 6, 16, 26, 4, 14, 24, 19, 9, 29, 12, 2, 7, 22, 27, 17.

Next, the bits are read from the matrix for transmission column by column, starting from the up-most bit of the first column to the left.

FIG. 3C illustrates deinterleaving performed by the deinterleaver unit 216 of a receiver. As stated in connection with FIG. 2, the deinterleaving unit 216 reads bits from the output of the combiner 214 one bit at a time. FIG. 3C shows bits read by the deinterleaver unit. First read bits reside to the left. The deinterleaver unit knows the location of each bit in the frame from synchronization. Therefore, as the deinterleaver unit reads bit $b_i$ from the output of the combiner, it is aware of the location of the bit $b_i$ in the frame and in the interleaving matrix. As the interleaving method and the inter-column permutation pattern is known to the receiver, the deinterleaver unit is able to determine the location of each bit in the deinterleaved frame and store the bits in their correct position in the memory 218. In the example of FIG. 3C, the memory 218 comprises a matrix representing the deinterleaved frame. The matrix is of the same form as the matrix of FIG. 3A.

As a non-limiting example of deinterleaving, let us study a UMTS WDMA system. As the deinterleaving unit read two first bits of a frame from the output of the combiner, it stores the bits in memory places $b_1$ and $b_{31}$ of the frame stored in the memory 218 (referring to the numbering used in FIG. 3A). The next bits are stored in memory places $b_{21}, b_{22}, b_{11}, b_{12}$ and so on. The location of the bits may be determined on the basis of the inter-column permutation pattern. When bits are read from the matrix, the reading is performed row by row. Thus, the order of the bits is the same as in the transmitter before interleaving.

Figure 4:
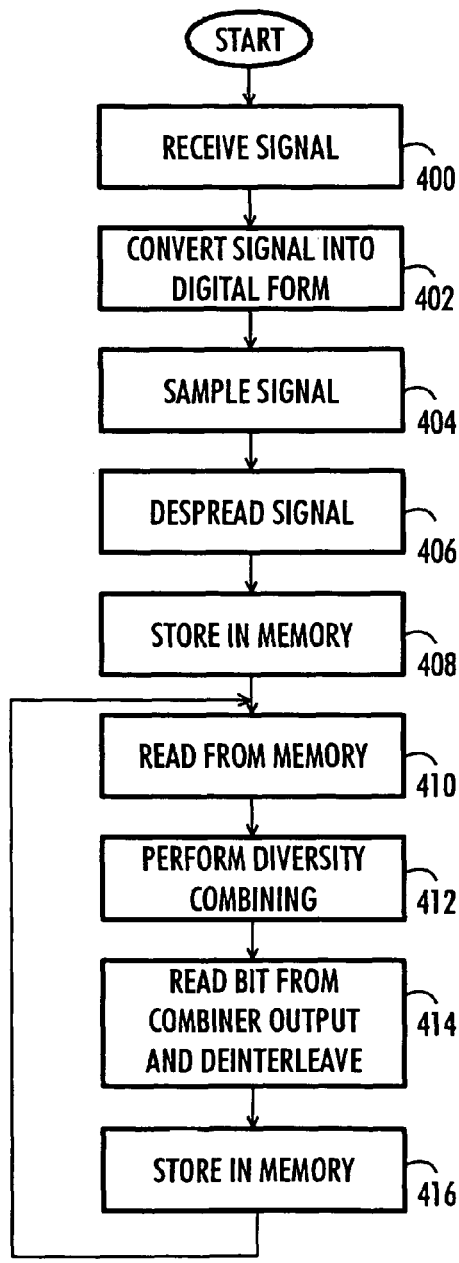
FIG. 4 is a flowchart illustrating an embodiment of the invention.

FIG. 4 is a flowchart illustrating an embodiment of the invention. In step 400, a receiver receives a frame format signal with at least two diversity branches. The received signal may comprise multipath propagated components.

In step 402, the signal is converted into a digital form for example in an A/D converter.

In step 404, the signal is sampled in a sampler.

In step 406, the sampled signal is despread in a despreader. In the input of the despreader the signal consists of chips, and in the output of the despreader the signal consists of symbols of two bits each.

In step 408, the symbols are stored in a first memory. The symbols of multipath propagated signal components are stored separately.

In step 410, the symbols of multipath propagated signal components are read from the first memory.

In step 412, diversity combining is performed in a combiner. The output of the combiner comprises combined symbols comprising two bits each.

In step 414, bits are read from the output of the combiner one by one, and deinterleaving is performed by calculating the location of each bit in a deinterleaved frame on the basis of the location of the bit in the received frame.

In step 416, the bits are stored in a second memory in the calculated location. Next, the following symbols to be combined are read from the first memory and the process continues from step 410.

Embodiments of the invention may be realized in a base station of a mobile station receiver. Embodiments of the invention may be realized with an integrated circuit implementing at least a part of the base band parts of a receiver. Parts of the receiver may be implemented with software or a computer program. For example, deinterleaving may be performed by software. The controller and/or the deinterleaving unit may be realized with processors and associated software configured to perform at least some of the steps described in connection with the flowchart of FIG. 4 and in connection with FIG. 3C.

The software or computer program may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

Even though the invention has been described above with reference to an example according to the accompanying drawings, it is clear that the invention is not restricted thereto but it can be modified in several ways within the scope of the appended claims.

What is claimed is:

1. A method, comprising:
    receiving in a wideband code division multiple access telecommunication receiver a frame format signal with at least two diversity branches;
    converting the signal into a digital signal;
    sampling the digital signal to provide a sampled signal;
    despreading the sampled signal to provide a despread signal comprising symbols;
    storing the symbols in a first memory;

reading the symbols from the first memory;
diversity-combining the symbols in a combiner, wherein an output of the combiner provides combined symbols comprising two bits per symbol;
reading bits from the output of the combiner and deinterleaving the bits at the output of the combiner by calculating a final location of a particular bit in a deinterleaved frame based on an initial location of the particular bit in a received frame; and
storing the bits in a second memory in the final location.

2. The method of claim 1, wherein the at least two diversity branches comprise multipath components of a signal.

3. The method of claim 1, further comprising:
reading multipath propagated diversity symbols from the first memory;
combining, in the combiner, the diversity symbols into a combined symbol comprising two bits;
placing the bits in the output of the combiner;
reading the particular bit from the output of the combiner;
determining the initial location of the particular bit in the received frame;
calculating the final location for the bit in the deinterleaved frame based on the determined location; and
storing the bit in the second memory in the final location.

4. The method of claim 1, further comprising calculating the final location of the particular bit in the deinterleaved frame by utilizing predetermined information about an interleaving method used when transmitting the symbols.

5. The method of claim 1, further comprising:
storing symbols of the received frame in the first memory; and
storing symbols of the deinterleaved frame in the second memory.

6. An apparatus, comprising:
a sampler configured to sample a received frame format signal comprising at least two diversity branches and to provide a sampled signal;
a despreader configured to despread the sampled signal and provide a despread signal comprising symbols;
a first memory configured to store the symbols;
a diversity combiner configured to read the symbols from the first memory, to diversity-combine the symbols, and to provide an output of combined symbols comprising two bits per symbol;
a deinterleaver configured to read bits from the output of the combiner and deinterleave the bits at the output of the diversity combiner by calculating a final location of a particular bit in a deinterleaved frame based on an initial location of the particular bit in a received frame; and
a second memory configured to store the bits in the final location.

7. An integrated circuit, comprising:
a sampler configured to sample a frame format signal comprising at least two diversity branches and to provide a sampled signal;
a despreader configured to despread the sampled signal and to provide a despread signal comprising symbols;
a first memory configured to store the symbols;
a diversity combiner configured to read the symbols from the first memory, to diversity-combine the symbols, and to provide an output of combined symbols comprising two bits per symbol;
a deinterleaver configured to read bits from the output of the combiner and deinterleave the bits at the output of the diversity combiner by calculating a final location of a particular bit in a deinterleaved frame based on an initial location of the particular bit in a received frame; and
a second memory configured to store the bits in the final location.

8. An apparatus, comprising:
sampling means for sampling a received frame format signal comprising at least two diversity branches and providing a sampled signal;
despreading means for despreading the sampled signal and providing a despread signal comprising symbols;
first memory means for storing the symbols;
combining means for reading the symbols from the first memory means, diversity-combining the read symbols, and providing an output of combined symbols comprising two bits per symbol;
deinterleaving means for reading bits from the output of the combiner and deinterleaving the bits at the output of the combining means by calculating a final location of a particular bit in a deinterleaved frame based on an initial location of the particular bit in a received frame; and
second memory means for storing the bits in the final location.

9. A computer readable storage medium, readable by a computer and encoding a computer program of instructions for executing a computer process in a wideband code division multiple access telecommunication receiver, the process comprising:
receiving a frame format signal with at least two diversity branches;
converting the signal into a digital signal;
sampling the digital signal to provide a sampled signal;
despreading the sampled signal to provide a despread signal comprising symbols;
storing the symbols into a first memory;
reading the symbols from the first memory;
diversity-combining the symbols in a combiner, wherein an output of the combiner provides combined symbols comprising two bits per symbol;
reading bits from the output of the combiner and deinterleaving the bits at the output of the combiner by calculating a final location of a particular bit in a deinterleaved frame based on an initial location of the particular bit in a received frame; and
storing the bits in a second memory in the final location.

10. The apparatus of claim 6, wherein the at least two diversity branches comprise multipath components of a signal.

11. The apparatus of claim 6, wherein the diversity combiner is further configured to read multipath propagated diversity symbols from the first memory, combine the diversity symbols into a combined symbol comprising two bits, and place the bits in the output of the combiner, and
wherein the deinterleaver is further configured to read the particular bit from the output of the combiner, to determine the initial location of the particular bit in the received frame, to calculate the final location for the bit in the deinterleaved frame based on the determined location, and store the bit in the second memory in the final location.

12. The apparatus of claim 6, wherein the deinterleaver is configured to calculate the final location of the particular bit in the deinterleaved frame by utilizing predetermined information about an interleaving method used when transmitting the symbols.

* * * * *